US008783218B2

(12) United States Patent
Shen et al.

(10) Patent No.: US 8,783,218 B2
(45) Date of Patent: Jul. 22, 2014

(54) TOROIDAL COMBUSTION CHAMBER WITH SIDE INJECTION

(75) Inventors: Huixian Shen, Southfield, MI (US); Peter Hofbauer, West Bloomfield, MI (US)

(73) Assignee: EcoMotors International, Allen Park, MI (US)

( * ) Notice: Subject to any disclaimer, the term of this patent is extended or adjusted under 35 U.S.C. 154(b) by 91 days.

(21) Appl. No.: 13/542,706

(22) Filed: Jul. 6, 2012

(65) Prior Publication Data

US 2013/0014718 A1 Jan. 17, 2013

Related U.S. Application Data

(60) Provisional application No. 61/508,151, filed on Jul. 15, 2011.

(51) Int. Cl.

| | |
|---|---|
| ***F01B 7/12*** | (2006.01) |
| ***F02B 75/24*** | (2006.01) |
| ***F02B 75/18*** | (2006.01) |
| ***F02B 75/12*** | (2006.01) |
| ***F02B 75/20*** | (2006.01) |

(52) U.S. Cl.

USPC ...... 123/51 R; 123/53.3; 123/53.6; 123/55.2; 123/58.1

(58) Field of Classification Search

USPC .................... 123/51 R, 53.3, 53.6, 55.2, 58.1

See application file for complete search history.

(56) References Cited

U.S. PATENT DOCUMENTS

| | | | | |
|---|---|---|---|---|
| 2,596,004 | A * | 5/1952 | Barrett | 417/238 |
| 3,085,557 | A | 4/1963 | Meurer | |
| 4,351,294 | A | 9/1982 | Giddings | |
| 5,799,629 | A | 9/1998 | Lowi | |
| 6,170,443 | B1 | 1/2001 | Hofbauer | |
| 6,182,619 | B1 | 2/2001 | Spitzer | |
| 6,189,500 | B1 * | 2/2001 | Gyllenstedt | 123/193.6 |
| 2005/0172926 | A1 * | 8/2005 | Poola et al. | 123/193.6 |
| 2010/0012078 | A1 | 1/2010 | Cerruti | |
| 2010/0082192 | A1 | 4/2010 | Hofbauer | |
| 2010/0192923 | A1 * | 8/2010 | Cox | 123/51 BC |
| 2011/0094470 | A1 | 4/2011 | Augot | |

FOREIGN PATENT DOCUMENTS

| | | |
|---|---|---|
| GB | 531366 | 1/1941 |
| WO | 0248524 A | 6/2002 |

* cited by examiner

*Primary Examiner* — Lindsay Low
*Assistant Examiner* — Charles Brauch
(74) *Attorney, Agent, or Firm* — Diana D. Brehob

(57) ABSTRACT

A toroidal combustion chamber shape with a side injector is disclosed for an opposed-piston engine. Fuel is injected into the toroidal volume from a fuel injector in the cylinder wall. In one embodiment, fuel is injected from each injector a plurality of times with the timing between the injections such that fuel clouds from each injection remain substantially isolated from each other.

21 Claims, 6 Drawing Sheets

TOROIDAL COMBUSTION CHAMBER WITH SIDE INJECTION

CROSS REFERENCE TO RELATED APPLICATIONS

The present application claims priority benefit from U.S. provisional patent application 61/508,151 filed 15 Jul. 2011.

FIELD

The present disclosure relates to shape of the combustion chamber and injector orientation in internal combustion engines.

BACKGROUND

Thermal efficiency and engine-out emissions from an internal combustion engine are determined by many factors including the combustion system design and the mechanical design. Combustion system design includes combustion chamber shape, the fuel injection nozzle, and the fuel injection pressure, intake manifold and exhaust manifold, etc. All of these together are optimized to achieve mixing quality that leads to effective combustion. Much is known and much has been studied in typical diesel engine combustion systems to determine what chamber shape and fuel injection characteristics lead to the desired output. However, in unconventional engines, less is known about what combustion chamber shape and fuel injection characteristics can provide the desired mixing and engine performance.

Such an unconventional engine, an opposed-piston, opposed-cylinder (OPOC) engine 10, is shown isometrically in FIG. 1. An intake piston 12 and an exhaust piston 14 reciprocate within each of first and second cylinders (cylinders not shown to facilitate viewing pistons). An intake piston 12' and an exhaust piston 14 couple to a journal (not visible) of crankshaft 20 via pushrods 16. An intake piston 12 and exhaust piston 14' couple to two journals (not visible) of crankshaft 20 via pullrods 18, with each intake piston 12 having two pullrods 18. The engine in FIG. 1 has two combustion chambers formed between a piston top 22 of intake piston 12 (or 12') and a piston top 24 of exhaust piston 14 (or 14') and the cylinder wall (not shown). The pistons in both cylinders are shown are at an intermediate position in FIG. 1. Combustion is initiated when the pistons are proximate each other. The piston tops 22 and 24 in FIG. 1 may not be optimized to provide the desired performance.

SUMMARY

An internal combustion engine is disclosed which includes a cylinder wall with first and second pistons adapted to reciprocate therein. The two pistons are disposed in the cylinder in an opposed fashion. A crankshaft having first and second eccentric journals couples to the first and second pistons via first and second connecting rods. At a particular angle of rotation of the crankshaft, the pistons are at their closest approach. The piston top of the first piston has three regions: a center, an outer ring near the periphery of the piston, and an inner ring, all of which have a center that is substantially coincident with a central axis of the cylinder. The piston top of the second piston has three regions: a center, outer ring near the periphery of the piston, and inner ring, all of which have a center that is substantially coincident with the central axis of the cylinder. Surfaces of the pistons are a predetermined distance apart in the outer ring and center regions when the crankshaft is at the particular angle. A volume between the first and second pistons proximate the inner ring substantially forms a toroidal volume when the crankshaft is at the particular angle. The predetermined distance is in the range of 0.5 to 3 mm.

The engine also includes a fuel injector disposed in the cylinder wall with an axis of the fuel injector roughly normal to the cylinder wall. A channel is defined in the outer ring to provide an opening for line-of-sight access from a tip of the injector to the toroidal volume formed between the pistons. The fuel injector has at least one orifice and the orifice is arranged so that a spray exiting the orifice is largely directed into the toroidal volume. The fuel injector may contain a plurality of orifices from which fuel sprays exit. In some embodiments, two fuel injectors are provided and orifices of the injector are aligned with channels cut into the outer ring of the pistons for line-of-sight access from the tips of the injectors to the toroidal volume formed between the pistons. The first and second injectors are located about 180 degrees around the cylinder from each other.

In one embodiment, the surfaces of the first and second pistons in the center regions are substantially flat. Alternatively, a surface of the first piston is concave in the central region and the second piston is convex in the central region. The engine is a two-stroke engine; the first piston is an intake piston; the second piston is an exhaust piston; intake ports are defined in the cylinder wall proximate the intake piston; and exhaust ports are defined in the cylinder wall proximate the exhaust piston.

Also disclosed is a method to provide fuel to an opposed-piston, internal-combustion engine including: injecting fuel multiple times into a combustion chamber, which includes: a cylinder wall, an intake piston disposed within the cylinder wall, an exhaust piston disposed within the cylinder wall with a top of the intake piston opposite a top of the exhaust piston. The tops of the intake and exhaust pistons each have three regions: a center, an outer ring near the periphery of the piston, and an inner ring, all of which are have a center substantially coincident with a central axis of the cylinder. Two channels are defined in the outer ring region of the intake piston with the two channels diametrically opposed. A volume between the first and second pistons proximate the inner ring substantially forms a toroidal volume. The combustion chamber further includes first and second fuel injectors disposed in the cylinder wall with the first injector proximate the first channel and the second injector proximate the second channel. The injection can be single event or multiple events based on different operating conditions. The multiple injections are separated in time such that a fuel cloud from a second injection is substantially separate from a fuel cloud from the first injection.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 1:
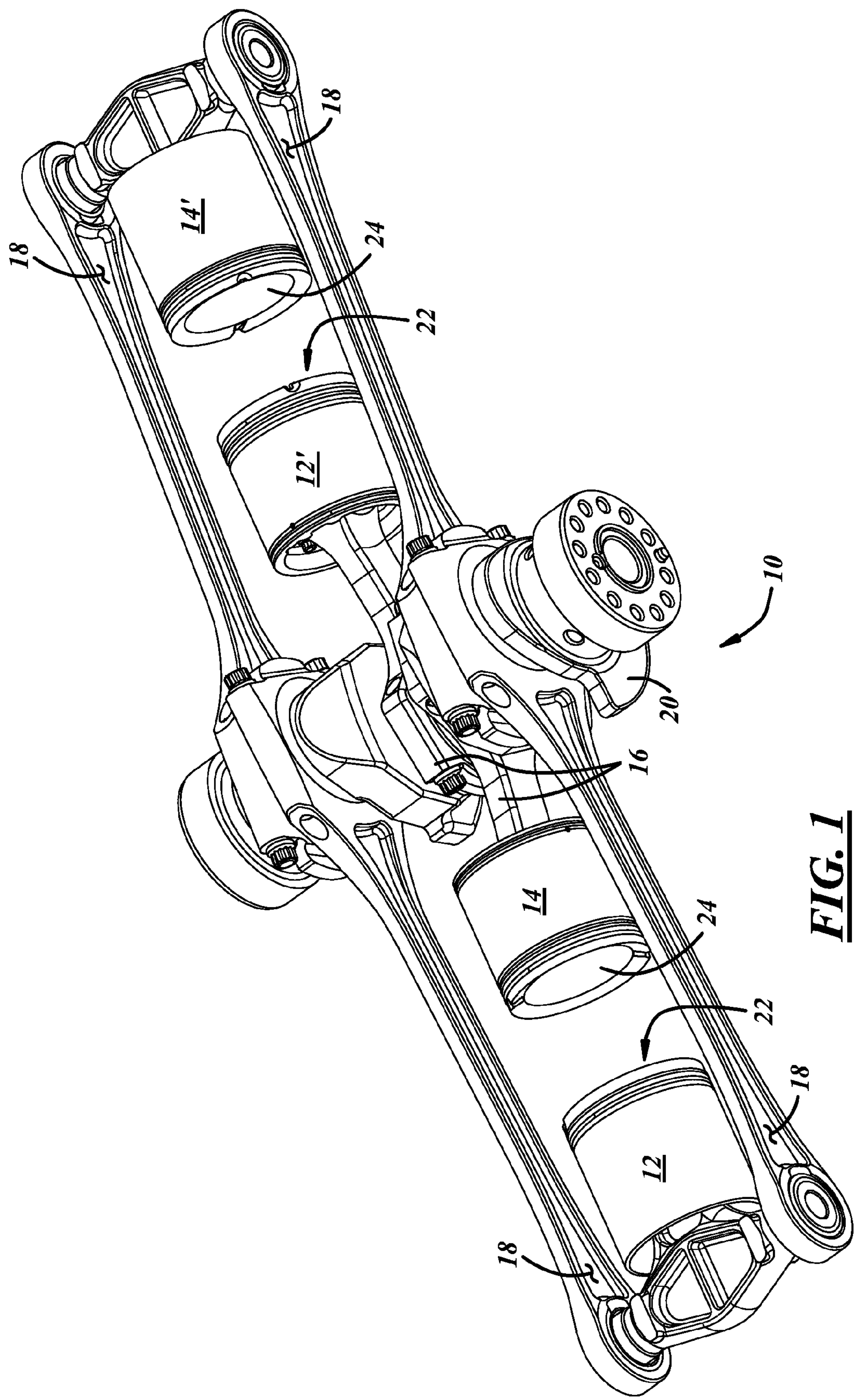
FIG. 1 is an isometric drawing of an OPOC engine.
Figure 2:
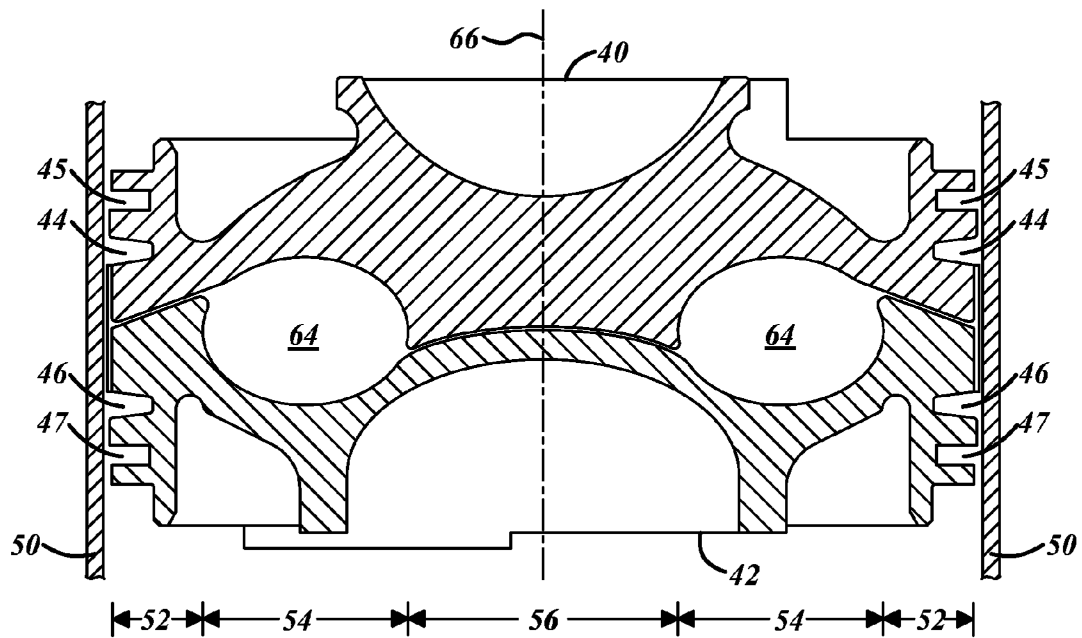
FIGS. 2 and 3 are cross sections of a combustion chamber according to an embodiment of the disclosure.

In FIG. 2, a cross section of a portion of an OPOC engine is shown illustrating a combustion chamber according to an embodiment of the disclosure. A portion of intake piston 40 and a portion of exhaust piston 42 are shown at their closest position. Piston 40 has grooves 44 and 45 and piston 42 has grooves 46 and 47 to accommodate piston rings (not shown). Pistons 40 and 42 reciprocate within cylinder wall 50. The combustion chamber is the volume enclosed between the tops of pistons 40 and 42 and the cylinder wall 50.

Figure 3:
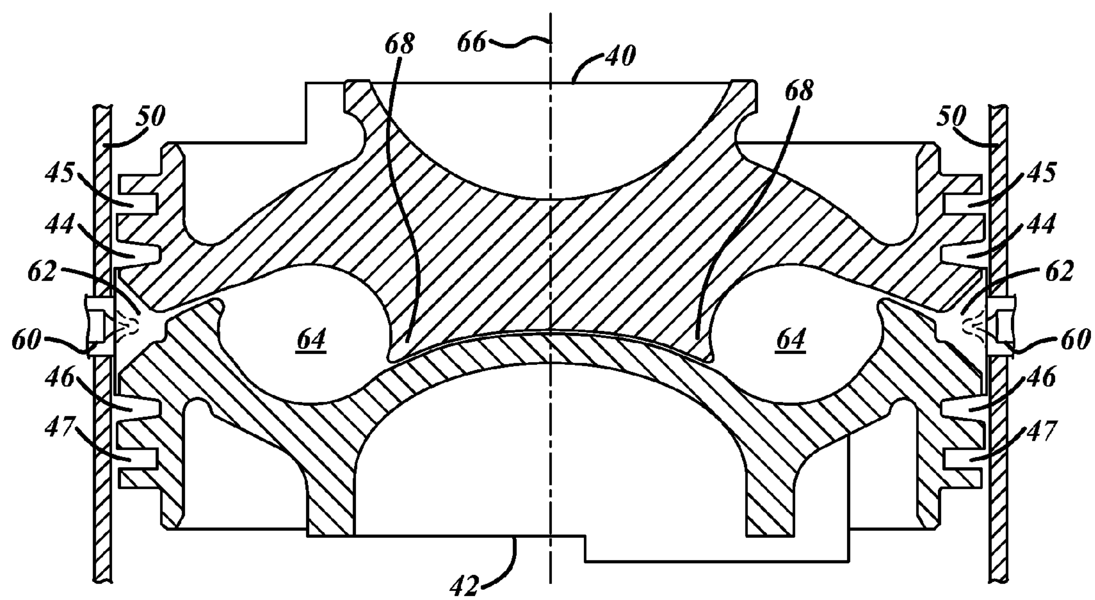

The cross section illustrated in FIG. 3 is a rotated 90 degrees with respect to the cross section illustrated in FIG. 2. The cross section in FIG. 3 cuts through injectors 60. It can be seen that proximate injectors 60, a pocket 62 is provided to accommodate injectors 60. Sprays emanating from injectors 60 are discussed below.

Figure 4:
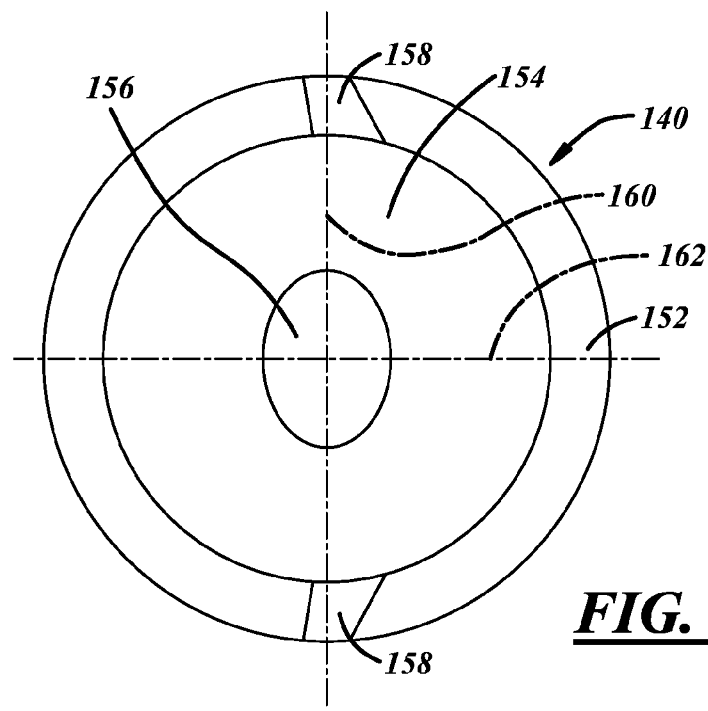
FIG. 4 is a sketch of the regions on the piston top.

A top of intake piston 140 is shown in FIG. 4. The piston is shown having three regions: outer ring 152, inner ring 154, and center 156. Exhaust piston 142 has three corresponding regions: an outer ring, an inner ring, and a center. The majority of the volume of the combustion chamber, when the pistons are in close proximity, is contained in the volume between the inner ring surface of the intake piston and the inner ring surface of the exhaust piston. Outer ring 152 includes passages 158 defined therein to allow for line-of-sight access between fuel injectors (not shown) and the toroidal volume associated with inner ring 154. As shown in FIG. 2, the surfaces of the outer ring of the intake and exhaust pistons are displaced from each other a small distance: at most 2 mm, at least 0.5 mm. Very little of the combustion chamber volume is contained between the pistons in the outer ring region. Similarly, the exhaust piston top and the intake piston top are displaced from each other a very small distance in the center region and thus, very little of the combustion chamber volume is contained between the pistons in the center region.

The cross section of the combustion chamber volume, as shown in FIGS. 2 and 3, is two oval areas 64. The shape of the combustion chamber in the inner ring region is a surface of revolution generated by revolving oval area 64 in space about a central axis 66 of cylinder 50. Strictly speaking, a torus is the result of rotating a circle around an axis. However, in the present disclosure, the term torus is used to apply to any 2-dimensional shape rotated about the central axis. In the embodiment in FIGS. 2 and 3, the shape rotated about the central axis is generally curved, but not a circle. Nevertheless, the term torus is applied to the resulting combustion chamber. Furthermore, the term torus is being used to describe a shape in which the cross-sectional area is not constant as taken along points in the revolution. For example in FIG. 4, as outer ring 152 is shown as an annulus and is defined by a circle at the interior edge and center 156 is an oval. Dotted lines 160 and 162 are axes of symmetry of center 156. If the depth of inner ring 154 is substantially constant throughout inner ring 154, the lesser width near axis 160 indicates that the cross sectional area (taken through the central axis of the cylinder) is less than the cross sectional area near axis 162. The term toroidal volume is applied to such a situation in which the cross-sectional area varies around the circumference. Also, the smaller cross-sectional area is smaller close to passages 158 because the fuel coming out of the injectors is compact. The cross sectional area is greater in the region of axis 162, which is farther from the injector tips. At this location, the fuel spray has expanded. With such a configuration, it is easier to avoid fuel droplets from impacting the piston top when the larger cross-sectional area is provided somewhat away from the injector tip.

The center region of the top of intake piston 40 has a concave shape and the center region of the top of exhaust piston 42 has a convex shape; these nest together. The top of exhaust piston 42 is at a higher temperature than the top of intake piston 40 because the exhaust gases exit through exhaust ports proximate exhaust piston 42. Thus, it is an advantage for exhaust piston 42 to have a convex shape with no corners that might generate hot spots. Corners 68 on center region 56 of the top of intake piston 40 could be problematic on an exhaust piston, but are less likely to present issues on an intake piston.

Figure 5:
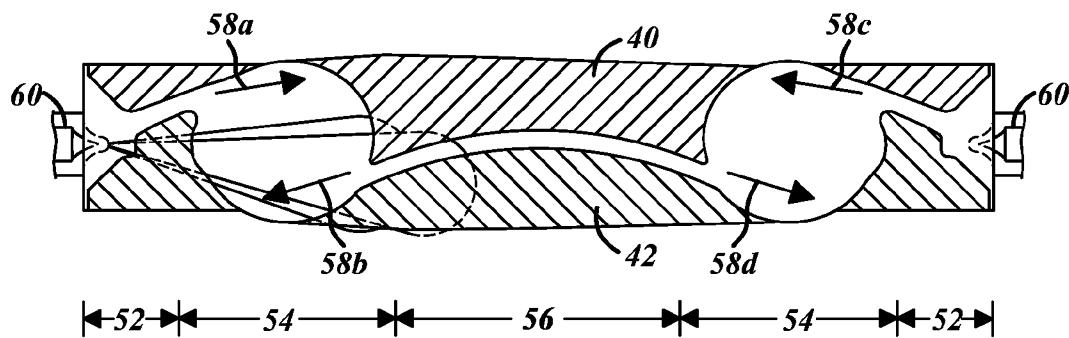
FIGS. 5 and 6 show the combustion chamber of FIGS. 2 and 3 at crank angle positions displaced from that of the closest approach of the pistons.

Pistons 40 and 42 are at their closest approach in FIGS. 2 and 3. The combustion chamber at a position 10 crank angle degrees rotated away from the position of closest approach is shown in FIGS. 5 and 30 crank degrees rotated in FIG. 6.

Figure 7:
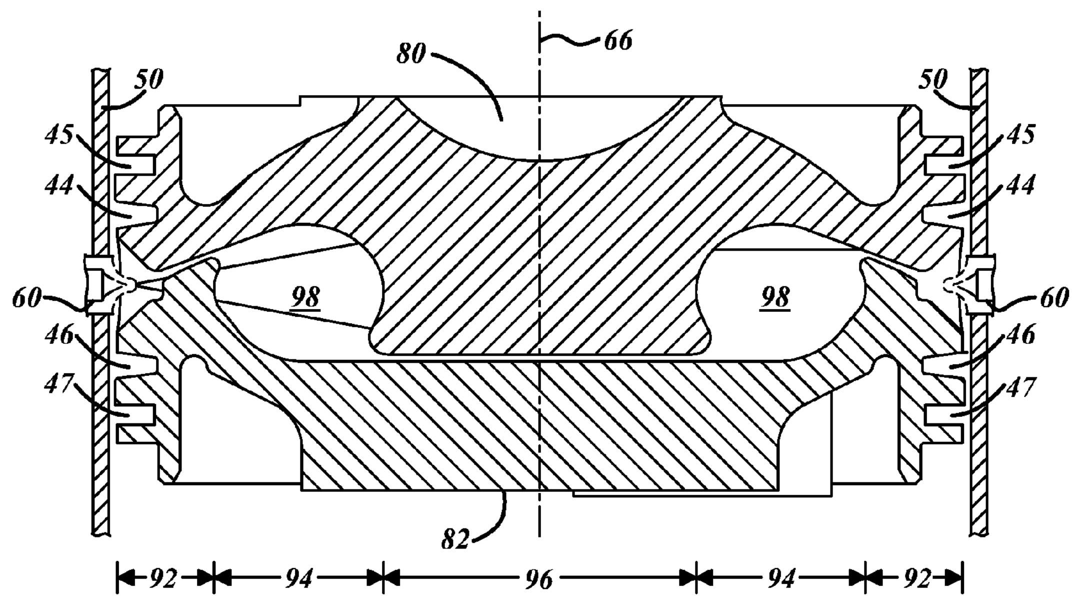
FIG. 7 is a cross section of a combustion chamber according to an embodiment of the disclosure.

In an alternative embodiment in FIG. 7, center regions 96 of the intake and exhaust pistons are flat. The bulk of the combustion chamber in this alternative is yielded by revolving region 98 about central axis 66 of cylinder 50.

Figure 8:
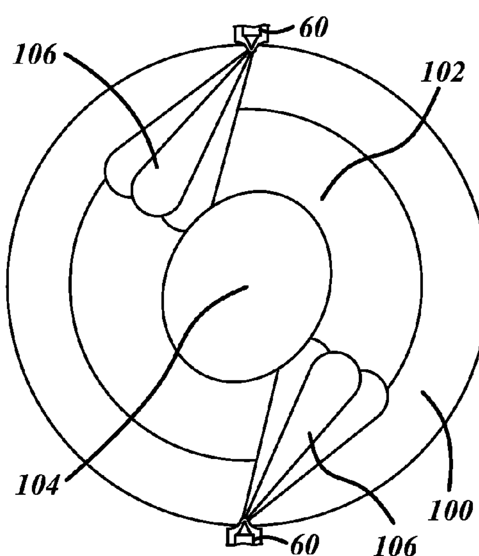
FIGS. 8 and 9 illustrate intake and exhaust piston tops, respectively, for the combustion chamber of FIG. 7.

In FIG. 8, a view of the top of intake piston 80 is shown with orifices on injectors 60 situated so that fuel jets 106 travel through channels in the piston top. The channels are not separately visible in the view in FIG. 8. Fuel jets 106 are directed into the inner ring region 102, which is depressed with respect to center region 104 and outer ring region 100. In the embodiment shown in FIG. 8, four fuel jets emanate from injector 60, with one of the fuel jets not visible. There is a very small angle between the individual jets. Alternatively, an injector with a different number of jets may be used. The jets are directed along a tangent of the surface of the toroidal volume to limit the amount of fuel droplets coming in direct contact with the piston top. The rounded surfaces of the torus help to direct the flow toward the center of the toroidal volume.

Figure 9:
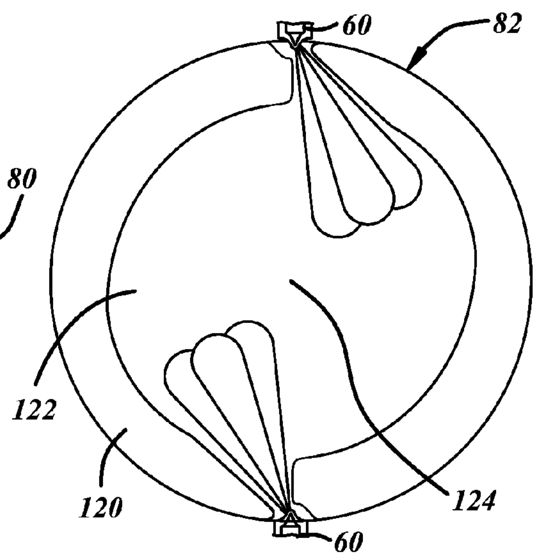

In FIG. 9, the top of exhaust piston 82 has a raised outer ring 120 with the inner ring 122 and 124 being at the same level of depression. Injectors 60 are shown directing fuel through channels (not separately shown) into inner ring region 122 at a direction substantially tangent to an interior edge of outer ring 120. There is just one pair of injectors 60, but illustrated in both FIGS. 8 and 9 to show how the fuel jets interact with the piston tops of the pistons.

Figure 10:
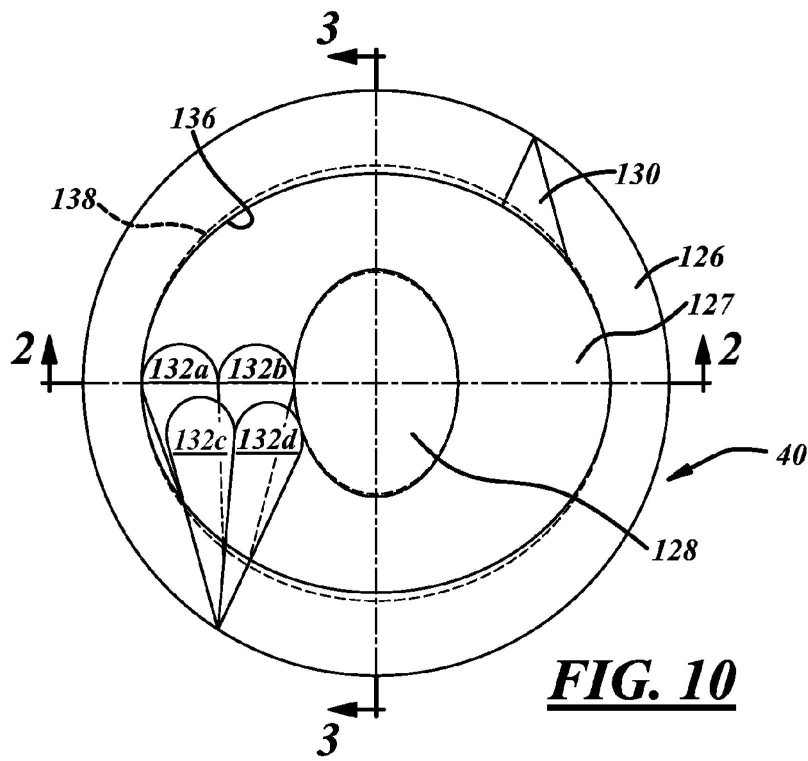
FIG. 10 is an illustration of the piston top of the intake piston associated with the combustion chamber of FIGS. 2 and 3

In FIG. 10, a detail of the top of intake piston 40 of FIGS. 2 and 3 is shown. A channel 130 is provided through outer ring 126 of the piston top to allow fuel jets to exit into the inner channel. Fuel jets are not shown in channel 130. Opposite channel 130 is another channel which is not visible due to the jets 132*a*, 132*b*, 132*c*, and 132*d* being illustrated, thereby not allowing a view of the channel. Fuel jets 132*a-d* are directed into the depression associated with inner ring 127. Center region 128 is oval. This allows a wider space in inner ring 127 to accommodate the fuel jets. Edge 136 is the visible edge of outer ring 126 from this view. The dashed line 138 shows that inner ring 127 is slightly re-entrant. There is no such undercut along the 2-2 section.

Figure 11:
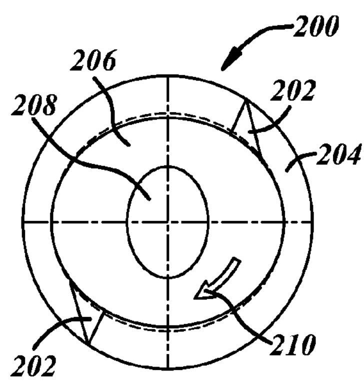
FIGS. 11-16 illustrate the location of fuel clouds from multiple injections into a combustion chamber according to an embodiment of the disclosure.
Figure 12:
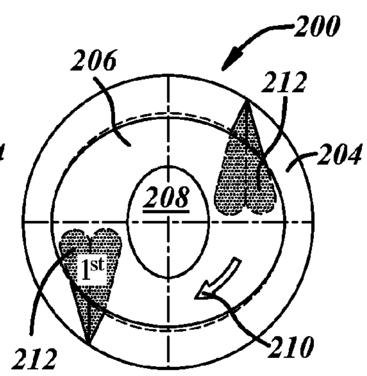
Figure 13:
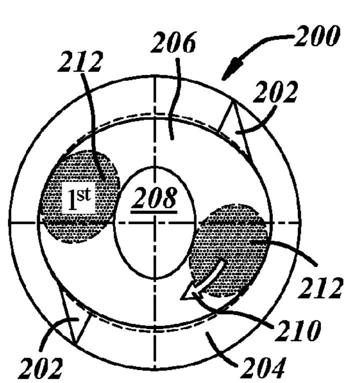
Figure 14:
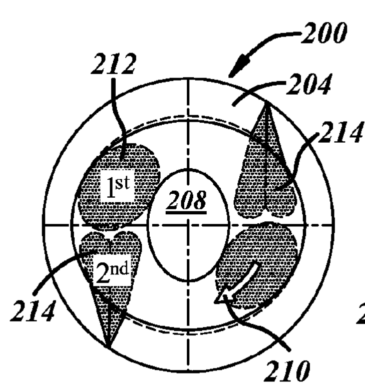
Figure 15:
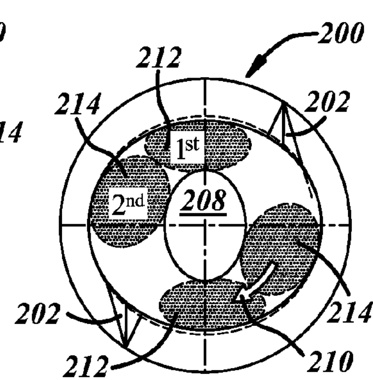
Figure 16:
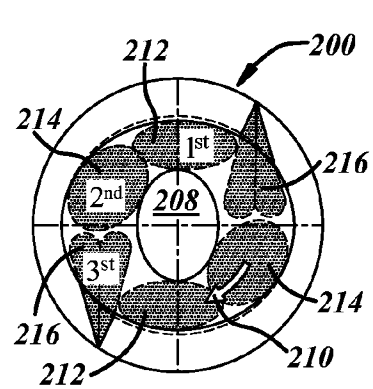

A method of distributing fuel into the cylinder is illustrated in FIGS. 11-16. Piston top 200 has channels 202 through which fuel jets can be sprayed. Piston top 200 has three regions: center 208, inner ring 206 and outer ring 204. A swirl flow 210 is developed, as shown in FIG. 11. In FIG. 12, fuel jets 212 are first injected. In FIG. 13, illustrating a snapshot later in time, fuel jets 212 rotate in inner ring 206 due to the momentum of the jets themselves as well as the swirl 200. Fuel jets 212 become fuel clouds in FIG. 13. In FIG. 14, an even later snapshot, a second injection causes fuel jets 214 to enter inner ring 206. The timing of the second injection is such that the tips of fuel jets 214 substantially do not overlap with fuel jets (now clouds) 212. In FIG. 15, fuel jets 212 and 214 are now both fuel clouds and have moved around inner ring 214 further. At a later time, in FIG. 16, a third injection produces fuel jets 216 with the timing of the third injection so that none of the clouds substantially overlap. Furthermore, the third cloud from the first injector does not overlap with the first cloud from the second injector.

Figure 6:
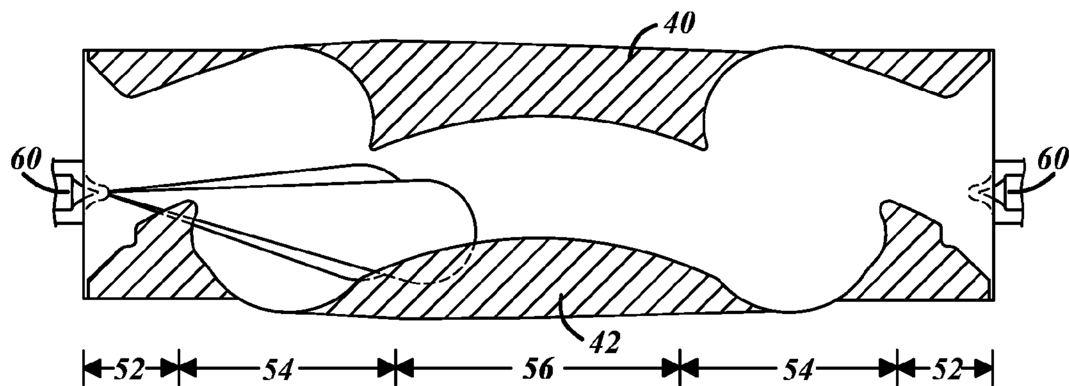

FIGS. 3, 4 and 6 show the combustion chamber shape from when the pistons are at their position of closest approach (FIG. 3) as they move away from each other (FIGS. 5 and 6). FIGS. 3, 4 and 6 can be considered in reverse order to show the combustion chamber shape as the pistons are moving toward each other. By considering the change of the combustion chamber from FIG. 6 to FIG. 5, the air that is between pistons 40 and 42 in the outer ring portion 52 is squished into the inner ring portion 54. Similarly, air between pistons 40 and 42 in the center 56 is squished into the inner ring portion 54. The movement caused by these squish flows is shown by arrows 58*a-d*. Because the opening connecting the volume associated with the outer ring region 52 with the volume associated with the inner ring region 54 is tangent to the inner ring region 54, a tumble flow is induced. Similarly, the opening connecting the volume associated with the center region 56 is tangent to the inner ring region, also promoting a tumble flow. The flow exiting from the squish regions induces flows in the direction of arrows 58*a* and 58*b* which causes a clockwise tumble, as view in the cross section illustrated in FIG. 5. The flow exiting from the squish regions induces flows in the direction of arrows 58*c* and 58*d* which causes a counter clockwise tumble.

Figure 17:
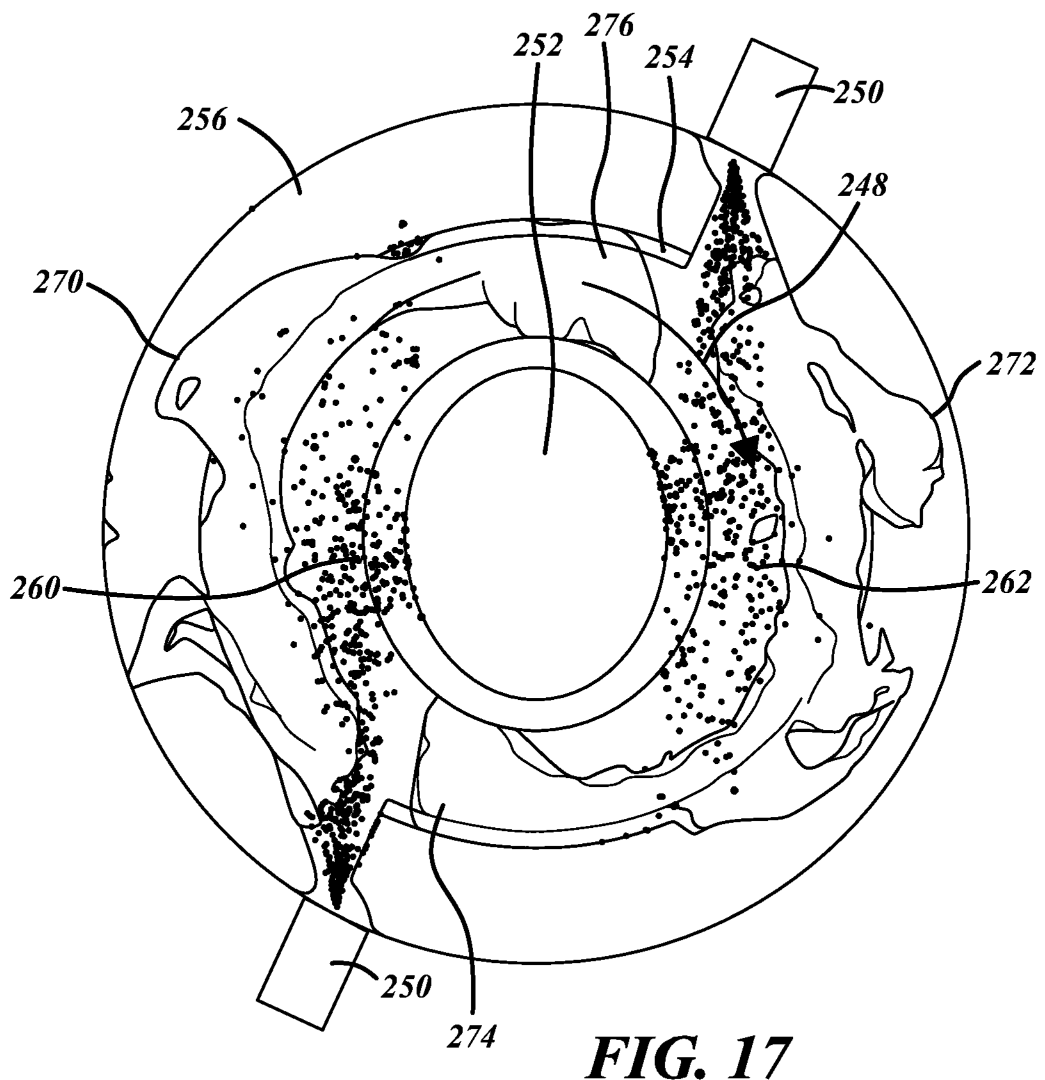
FIG. 17 shows a simulation of fuel injection and combustion in a chamber according to an embodiment of the disclosure.

In FIG. 17, a representation of modeling results is shown. Two injectors 250 inject fuel primarily into inner ring region 254, which is between center 252 and outer ring 256. The intake ports (not shown) are angled such that a swirl flow is induced by incoming gases into the cylinder, as shown by clockwise arrow 248. Injectors 250 inject fuel tangentially into inner ring region 254 in the direction of the swirl, as shown by arrow 248. Thus, fuel droplets are carried by the swirl flow.

A limitation in obtaining satisfactory combustion at the highest load condition is utilizing the air in the cylinder. This is accomplished by the fuel droplets being relatively uniformly mixed in the air at the highest torque operating condition in which the most fuel is injected. The representation in FIG. 17 is for a 100 mm bore cylinder with a swirl ratio of 5 at the highest torque condition, i.e., longest fuel pulse width anticipated. The crank angle illustrated in FIG. 17 is about 20 degrees into the expansion stroke, which is also the end of the fuel injection interval. Liquid droplets 260 and 262 are contained mostly in inner ring 254. Droplets 260 and 262 are shown much larger than in reality so that they can be viewed in FIG. 17. Much of the fuel has vaporized and combustion is occurring. Surfaces 270 and 272 are isothermal surfaces which are indicative of the surface of the flame. Some of the combustion is occurring in outer ring 256 having spilled out of inner ring 254. In FIG. 17, it can be seen that tips 274 and 276 of combustion surfaces 270 and 272, respectively, do not overlap. Based on hole sizes on the injector tip, injection pressure, the number of orifices on the injector, and the swirl ratio, the air utilization, as illustrated in FIG. 17 in which the combustion surfaces do not overlap but encompass most of inner ring 254, can be obtained.

Small orifices in the injector create small droplets that vaporize more readily. Such small droplets are helpful in avoiding soot formation. However, small droplets have low inertia and do not travel far into the chamber, which is harmful for air utilization. By injecting the fuel in the same direction as the swirl flow, small droplets are carried by the flow to access unused air away from the injector, thereby facilitating the injection of smaller droplets than could otherwise be used.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An internal combustion engine, comprising:

a cylinder wall;

a first piston disposed in the cylinder;

a second piston disposed in the cylinder in an opposed relationship with respect to the first piston;

a crankshaft having first and second eccentric journals;

a first connecting rod coupling the first piston to the first eccentric journal; and a second connecting rod coupling the second piston to the second eccentric journal, wherein:

the pistons reciprocate within the cylinder upon rotation of the crankshaft;

there is a particular angle of rotation of the crankshaft at which the pistons are closest to each other;

the piston top of the first piston has three regions: a center, an outer ring near the periphery of the piston, and an inner ring, all of which have a center that is substantially coincident with a central axis of the cylinder;

the piston top of the second piston has three regions: a center, an outer ring near the periphery of the piston, and an inner ring, all of which have a center that is substantially coincident with the central axis of the cylinder;

a face of the first piston and a face of the second piston are a predetermined distance apart in their respective center regions and the same predetermined distance apart in their respective outer rings when the crankshaft is at the particular angle, the predetermined distance is taken in a direction parallel to the central axis of the cylinder; and a volume between the first and second pistons proximate the inner ring substantially forms a toroidal volume when the crankshaft is at the particular angle.

2. The engine of claim 1, further comprising:

a fuel injector mounted in the cylinder wall with a longitudinal axis of the fuel injector roughly normal to the cylinder wall wherein a channel is defined in the outer ring of second piston to provide an opening for line-of-sight access from a tip of the injector to the toroidal volume formed between the pistons.

3. The engine of claim 2 wherein the fuel injector has at least one orifice and the orifice is arranged so that a spray exiting the orifice is largely directed into the toroidal volume.

4. The engine of claim 3 wherein fuel jets which exit from the injector are directed into the toroidal volume; the center region of the top of the second piston is oval; and the spray is directed substantially tangent to the oval near a shorter of the axes of symmetry of the oval.

5. The engine of claim 1 wherein the center region of the top of the first piston is oval in a direction taken perpendicular with respect to the central axis of the cylinder.

6. The engine of claim 1 wherein a cross sectional area of the substantially toroidal volume varies around the circumference of the toroidal volume.

7. The engine of claim 1, further comprising:

first and second fuel injectors disposed in the cylinder wall; and first and second channels defined in the outer ring of at least one of the first and second pistons and evenly spaced around the cylinder, the first channel providing line-of sight access between a tip of the first injector and the toroidal volume and the second channel providing line-of-sight access between a tip of the second injector and the toroidal volume wherein a cross-sectional area of the toroidal volume is less proximate the channels than at a position away from the channels.

8. The engine of claim 1 wherein surfaces of the first and second pistons in the center regions are substantially flat.

9. The engine of claim 1 wherein a surface of the first piston is concave in the central region and the second piston is convex in the central region.

10. The piston of claim 9 wherein the engine is an opposed-piston engine; the first piston is an intake piston; and the second piston is an exhaust piston.

11. The engine of claim 2 in which a swirl flow is induced in the toroidal volume during operation and fuel from the fuel injector is injected in the same general direction as the induced swirl flow.

12. A combustion chamber in an opposed-piston engine, comprising:

a cylinder wall;

an intake piston disposed within the cylinder wall;

an exhaust piston disposed within the cylinder wall with a top of the intake piston opposite a top of the exhaust piston wherein:

the piston top of the intake piston has three regions: a center, an outer ring near the periphery of the piston, and an inner ring, all of which are substantially symmetrically arranged with respect to a plane through a central axis of the cylinder;

the piston top of the exhaust piston has three regions: a center, an outer ring near the periphery of the piston, and an inner ring, all of which have a center substantially coincident with the central axis of the cylinder;

a channel is defined in the outer ring region of the exhaust piston; and wherein the center of the intake piston and the center of exhaust piston are a predetermined distance apart; and the outer ring of the intake piston and the outer ring of the exhaust piston are the same predetermined distance apart.

13. The combustion chamber of claim 12, further comprising: a fuel injector mounted in the cylinder wall wherein a volume between the first and second pistons proximate the inner ring substantially forms a toroidal volume and fuel jets which exit from the injector are directed into the toroidal volume.

14. The combustion chamber of claim 12 wherein the center region of the top of the exhaust piston is oval.

15. The combustion chamber of claim 13, further comprising: a fuel injector disposed in the cylinder wall wherein fuel jets which exit from the injector are directed into the toroidal volume and the center region of the top of the exhaust piston is oval and the jets are substantially tangent to the oval near a shorter of the axes of symmetry.

16. The combustion chamber of claim 12 wherein surfaces of the intake and exhaust pistons in the center regions are substantially flat.

17. The combustion chamber of claim 12 wherein a surface of the first piston is concave in the central region and the second piston is convex in the central region.

18. The combustion chamber of claim 14 wherein a volume between the first and second pistons proximate the inner ring substantially forms a toroidal volume; a swirl flow is induced in the toroidal volume:, and fuel from the fuel injector is injected in the same general direction as the induced swirl flow.

19. A method to provide fuel to an opposed-piston, internal-combustion engine, the method comprising:

injecting fuel multiple times into a combustion chamber of the engine, the combustion chamber comprising:

a cylinder wall;

an intake piston disposed within the cylinder wall;

an exhaust piston disposed within the cylinder wall with a top of the intake piston opposite a top of the exhaust piston wherein:

the piston top of the intake piston has three regions: a center, an outer ring near the periphery of the piston, and an inner ring, all of which are have a center substantially coincident with a central axis of the cylinder;

the piston top of the exhaust piston has three regions: a center, an outer ring near the periphery of the piston, and an inner ring, all of which have a center substantially coincident with the central axis of the cylinder wherein the center of the intake piston and the center of exhaust piston are a predetermined distance apart; and the outer ring of the intake piston and the outer ring of the exhaust piston are the same predetermined distance apart;

two channels are defined in the outer ring region of the intake piston with the two channels diametrically opposed; and a volume between the intake and exhaust pistons proximate the inner ring substantially forms a toroidal volume.

20. The method of claim 19 wherein the combustion chamber further includes first and second fuel injectors disposed in the cylinder wall.

21. The method of claim 19 wherein the multiple injections are separated in time such that a fuel cloud from a second injection is substantially separate from a fuel cloud from the first injection.

* * * * *